United States Patent
Johri et al.

(10) Patent No.: US 10,029,670 B2
(45) Date of Patent: Jul. 24, 2018

(54) SYSTEM AND METHOD TO PREVENT DRIVELINE FLOAT IN LASH REGION

(71) Applicant: FORD GLOBAL TECHNOLOGIES, LLC, Dearborn, MI (US)

(72) Inventors: Rajit Johri, Canton, MI (US); Ming Lang Kuang, Canton, MI (US); Francis Thomas Connolly, Ann Arbor, MI (US); Bernard D. Nefcy, Novi, MI (US); Yanan Zhao, Ann Arbor, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/345,705

(22) Filed: Nov. 8, 2016

(65) Prior Publication Data

US 2018/0126975 A1 May 10, 2018

(51) Int. Cl.
*B60W 20/11* (2016.01)
*B60W 10/06* (2006.01)
*B60W 10/08* (2006.01)

(52) U.S. Cl.
CPC ............ *B60W 20/11* (2016.01); *B60W 10/06* (2013.01); *B60W 10/08* (2013.01); *B60W 2710/0666* (2013.01); *B60W 2710/083* (2013.01); *Y10S 903/93* (2013.01)

(58) Field of Classification Search
CPC ...... B60W 20/11; B60W 10/08; B60W 10/06; B60W 2710/083; B60W 2710/0666
See application file for complete search history.

(56) References Cited

U.S. PATENT DOCUMENTS

| | | | |
|---|---|---|---|
| 6,053,843 A * | 4/2000 | Van Vuuren | B60W 10/06 477/109 |
| 6,468,183 B1 * | 10/2002 | O'Neil | B60W 10/06 477/107 |
| 6,506,140 B1 * | 1/2003 | O'Neil | B60W 10/06 477/168 |
| 6,543,414 B2 * | 4/2003 | O'Neil | B60W 10/06 123/350 |
| 6,910,990 B2 * | 6/2005 | Doering | F02D 41/0215 477/110 |
| 7,577,507 B2 | 8/2009 | Morris | |
| 7,917,275 B2 * | 3/2011 | Doering | F02D 41/0002 701/51 |
| 8,965,616 B2 | 2/2015 | Gibson et al. | |
| 8,968,151 B2 | 3/2015 | Dai et al. | |
| 2004/0152562 A1 * | 8/2004 | Cullen | B60W 10/06 477/107 |
| 2015/0274148 A1 | 10/2015 | Nefcy et al. | |
| 2016/0121877 A1 * | 5/2016 | Hancock | B60K 6/48 477/5 |

* cited by examiner

*Primary Examiner* — David J Hlavka
(74) *Attorney, Agent, or Firm* — David Kelley; Brooks Kushman P.C.

(57) ABSTRACT

A vehicle includes an engine and an electric machine coupled to a gearbox through a torque converter. The vehicle includes a controller programmed to command an engine torque and an electric machine torque to achieve a predetermined positive torque at the input of the torque converter when a driver demand torque at the torque converter input decreases to fall within a range between the predetermined positive torque and a predetermined negative torque.

6 Claims, 3 Drawing Sheets

SYSTEM AND METHOD TO PREVENT DRIVELINE FLOAT IN LASH REGION

TECHNICAL FIELD

This application generally relates to a torque control strategy for a hybrid vehicle

BACKGROUND

Vehicles include a transmission for transmitting power and torque to the drive wheels of the vehicle. Transmissions are available in a variety of configurations including manual, automatic, and hybrid. Vehicle transmissions may be comprised of a number of gears that mesh together to transfer torque through the transmission. Gears must be designed with some spacing such that the gears can easily rotate when meshed with other gears. As the gears wear during usage, the spacing may change. Because of the spacing, there may be lash or play in the gears. Lash occurs when the gears are not in full contact with one another as can happen when the torque changes direction. Undesirable noise may occur when the gears come in contact with one another.

SUMMARY

A vehicle includes an engine and an electric machine coupled to a gearbox through a torque converter. The vehicle further includes a controller programmed to, in response to a driver demand torque at an input of the torque converter decreasing to fall within a range between a predetermined positive torque and a predetermined negative torque, command and engine torque and an electric machine torque to achieve the predetermined positive torque at the input of the torque converter.

A powertrain control system includes an engine and an electric machine coupled to a gearbox through a torque converter. The powertrain control system further includes a controller programmed to, in response to a driver demand torque at the torque converter being between an impeller stall torque of the torque converter and a predetermined negative torque and a torque at the torque converter being greater than the impeller stall torque, command the engine and the electric machine to cause the torque to be the impeller stall torque.

A method includes operating, by a controller, an engine and an electric machine that are coupled to a gearbox through a torque converter to cause a torque of the torque converter to achieve an impeller stall torque in response to a driver demand torque at the torque converter being between the impeller stall torque and a predetermined negative torque and the torque being greater than the impeller stall torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
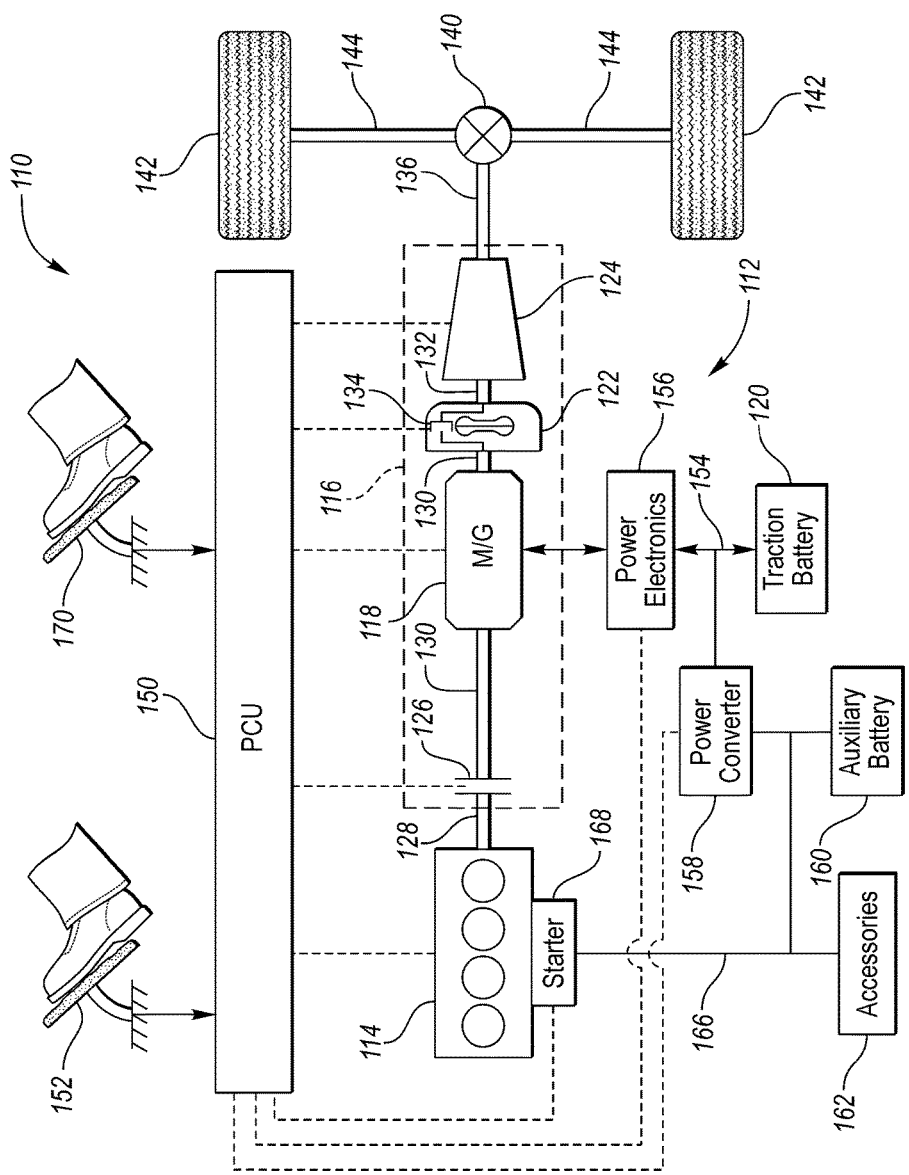
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine 118 such as an electric motor/generator (M/G), an associated traction battery 120, a torque converter 122, and a multiple step-ratio automatic transmission or gearbox 124. The electric machine 118 may also be reference to as the M/G (motor/generator).

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. A controller associated with the engine 114 may be configured to control engine power and engine torque to corresponding commanded values. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics 156 may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements are controllable through a shift schedule that connects and disconnects certain elements of the gear sets to control the ratio between a transmission output shaft 136 and the transmission input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 may include a predetermined gear ratio between the output shaft 136 and the axles 144. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by PCU 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The accelerator pedal position signal may be used to generator a driver torque demand that represents an amount of torque to be applied at the drive wheels 142.

The controller 150 may also control the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to power electronics 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The PCU 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from spinning wheels 142 is transferred back through the gearbox 124 and is converted into electrical energy for storage in the traction battery 120.

A brake pedal 170 is used by the driver of the vehicle to provide a brake demand signal for braking or negative torque to slow the vehicle. In general, depressing and releasing the brake pedal 170 generates a brake pedal position signal that may be interpreted by the controller 150 as a demand for increased braking or decreased braking, respectively. Based at least upon input from the brake pedal 170, the controller 150 commands braking torque from vehicle brakes (not illustrated). The vehicle brakes generally include friction brakes. The M/G 118 may additionally act as a generator to provide regenerative braking, in which rotational energy from spinning wheels 142 is transferred back through the gearbox 124 and is converted into electrical energy for storage in the battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The vehicle 110 may utilize the M/G 118 to start the engine 114. The PCU 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor 168 may also be coupled to the engine 114 to provide a secondary or backup means of starting the engine 114.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The gearbox 124 may be comprised of gears configured to mesh with one another to transfer torque from the transmission input shaft 132 to the transmission output shaft 136. The gears are subject to lash which may be caused by gaps between the gears. Driveline lash can be particularly noticeable when the torque applied to the gear changes direction. When torque is applied in one direction for a period of time, the gears are in contact with one another. When the torque is reduced or reversed, there may be a period of time in which the gears are not in contact with one another. During this period of time, the gears may be floating relative to one another. At some time, the gears may come in contact again. Noise, referred to as clunk, can be caused when the gears come in contact again.

During vehicle operation, a driver demand torque may be derived from the accelerator pedal position. For example, a propulsive torque demand may be a function of the accelerator pedal position and increases as the accelerator pedal position increases (e.g., accelerator pedal is depressed). The driver demand torque may be used to generate a powertrain torque command that may include torque commands to the engine 114 and the M/G 118. Under normal driving conditions, the powertrain torque command may be a propulsive torque command or a braking torque command. In some situations, the powertrain torque command may be comprised of an accelerator pedal component and a brake pedal component. For example, a driver may be depressing both the accelerator pedal 152 and the brake pedal 170 at the same time (e.g., two-pedal driving style). In this situation, the powertrain torque command due to the accelerator pedal 152 may be summed with powertrain torque command due to the brake pedal 170. The net result could be a powertrain torque command near zero. Such a powertrain torque command may cause the driveline to float near lash and create unacceptable driveline clunks.

For an open torque converter, there is a minimum input torque for maintain rotation of the torque converter 122. The torque below which the torque converter 122 no longer rotates may be referred to as the stall torque of the torque converter 122.

A strategy for preventing the requested powertrain torque from causing the driveline to float near lash is described herein. A zone around the lash region (e.g., zero torque) may be defined and the powertrain torque command may be modified to prevent torque from being commanded in the lash region.

The driver demand torque may be a torque value that is desired to be applied at the drive axle 144 for transfer to the wheels 142. The driver demand torque may be satisfied by any combination of engine torque and electric machine torque. Various strategies for determining the desired torque split between the engine and the electric machine are available and are not discussed herein. Due to the various gear ratios and component operation, the intermediate torques applied to the various components may be different. However, knowing the desired torque output, it is a simple matter to compute the torque at any point in the driveline. For example, knowing the gearbox gear ratios in each gear, the torque at the output of the gearbox 124 can be computed. As such, torque values may be referenced at any point within the driveline with knowledge that, by proper scaling, the torque values may be reflected to any point in the driveline. For example, the driver demand torque may be determined at the input of the torque converter 122.

Figure 2:
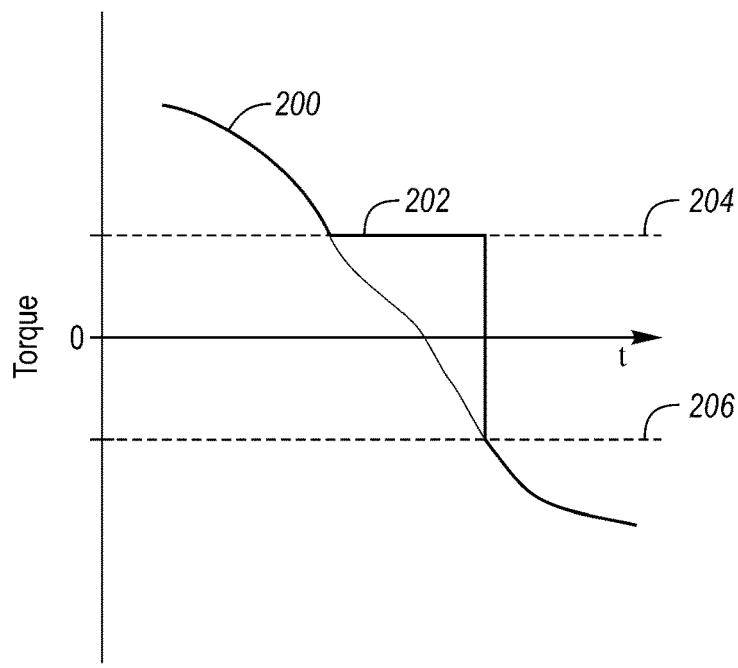
FIG. 2 is a plot of a possible trajectory of a driver demand torque at an input to a torque converter that is transitioning from positive to negative.

FIG. 2 depicts a graph of a possible trajectory of a driver demand torque 200 at the input to the torque converter 122. Note that the depicted driver demand torque 200 decreases over time and crosses zero and become negative. For example, the driver may be in coast mode or has applied the brake pedal 170. Also defined on the graph are an upper torque threshold 204 and a lower torque threshold 206. The upper torque threshold 204 may be a predetermined positive torque value. The lower torque threshold 206 may be a predetermined negative torque value.

The computation of the upper torque threshold 204 may be dynamic and the value may be adjusted periodically during vehicle operation. The upper torque threshold 204 may be based on a model of the torque converter 122. At low vehicle speeds, a minimum torque is required to maintain rotation of the impeller and the powertrain torque command may be prevented from falling below this minimum torque with an open torque converter. The impeller stall torque may be calculated as follows:

$$\tau_{imp}^{stall} = \left(\frac{\omega_{imp}^{min}}{K(SR)}\right)^2 \qquad (1)$$

$$SR = \frac{\omega_t}{\omega_{imp}^{min}} \qquad (2)$$

where $\omega_{imp}^{min}$ is the minimum impeller speed for stalling, $\omega_t$ is the present turbine speed, and K is the capacity factor curve which is a function of a speed ratio, SR.

Note that the speed ratio for this analysis is characterized by the turbine speed and the impeller stall speed. The speed ratio may be characterized by testing data and represented by a curve or function. The stall torque may be a minimum value when the capacity factor (K) is near a maximum value. The capacity factor may be near a maximum value when the speed ratio is in a range about a value of one. That is, when the turbine speed is approximately equal to the impeller stall speed.

The upper torque threshold 204 may be defined by a maximum of the impeller stall torque and a selectable calibration value. The selectable calibration value may be useful when the impeller stall torque is near zero. (e.g., when the turbine speed is near or greater than the impeller stall speed). The lower torque threshold 206 may be defined by a predetermined calibration value. The calibrated values may depend on the driveline hardware and may be a function of the present gear of the gearbox 124.

Also depicted in FIG. 2 is the powertrain torque command 202 at the input to the torque converter 122. The actual powertrain torque at the input to the torque converter 122 may be a sum of the torque produced by the engine 114 and the torque produced by the electric machine 118. The powertrain torque command 202 may be generated by any combination of electric machine torque and engine torque. A control strategy may be implanted such that the powertrain torque command 202 does not permit a requested torque value between the upper torque threshold 204 and the lower torque threshold 206. The control strategy creates a "no-fly zone" about zero torque that includes a range of torque values that will not be requested. When the driver demand torque 200 falls below the upper torque threshold 204 and is greater than the lower torque threshold 206, the powertrain torque command 202 takes the value of the upper torque threshold 204. The powertrain torque command 202 maintains the value of the upper torque threshold 204 until the driver demand torque 200 increases above the upper torque threshold 204 or falls below the lower torque threshold 206. When the driver demand torque 200 increases above the upper torque threshold 204 or falls below the lower torque threshold 206, the powertrain torque command 202 takes on the value of the driver demand torque 200 (e.g., powertrain torque command 202 equals the driver demand torque 200).

Figure 3:
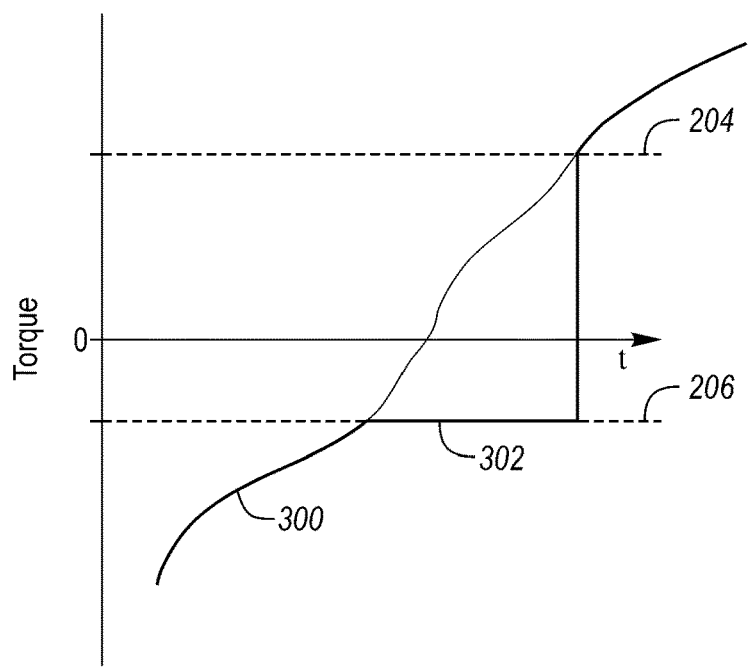
FIG. 3 is a plot of a possible trajectory of a driver demand torque at an input to a torque converter that is transitioning from negative to positive.

FIG. 3 depicts a possible torque trajectory when the driver demand torque 300 at the input to the torque converter 122 is a negative torque value. In this case, the driver demand torque 300 increases over time and crosses zero to become positive. Also depicted are the upper torque threshold 204 and the lower torque threshold 206. A powertrain torque command 302 is also depicted. The driver demand torque 300 increases to a value above the lower torque threshold 206. When the driver demand torque 300 exceeds the lower torque threshold 206, the powertrain torque command 302 is set to the lower torque threshold 206. The powertrain torque command 302 retains the value of the lower torque threshold 206 until the driver demand torque 300 rises above the upper torque threshold 204. When the driver demand torque 300 is greater than or equal to the upper torque threshold 204, the powertrain torque command 302 is set to the driver demand torque 300.

Figure 4:
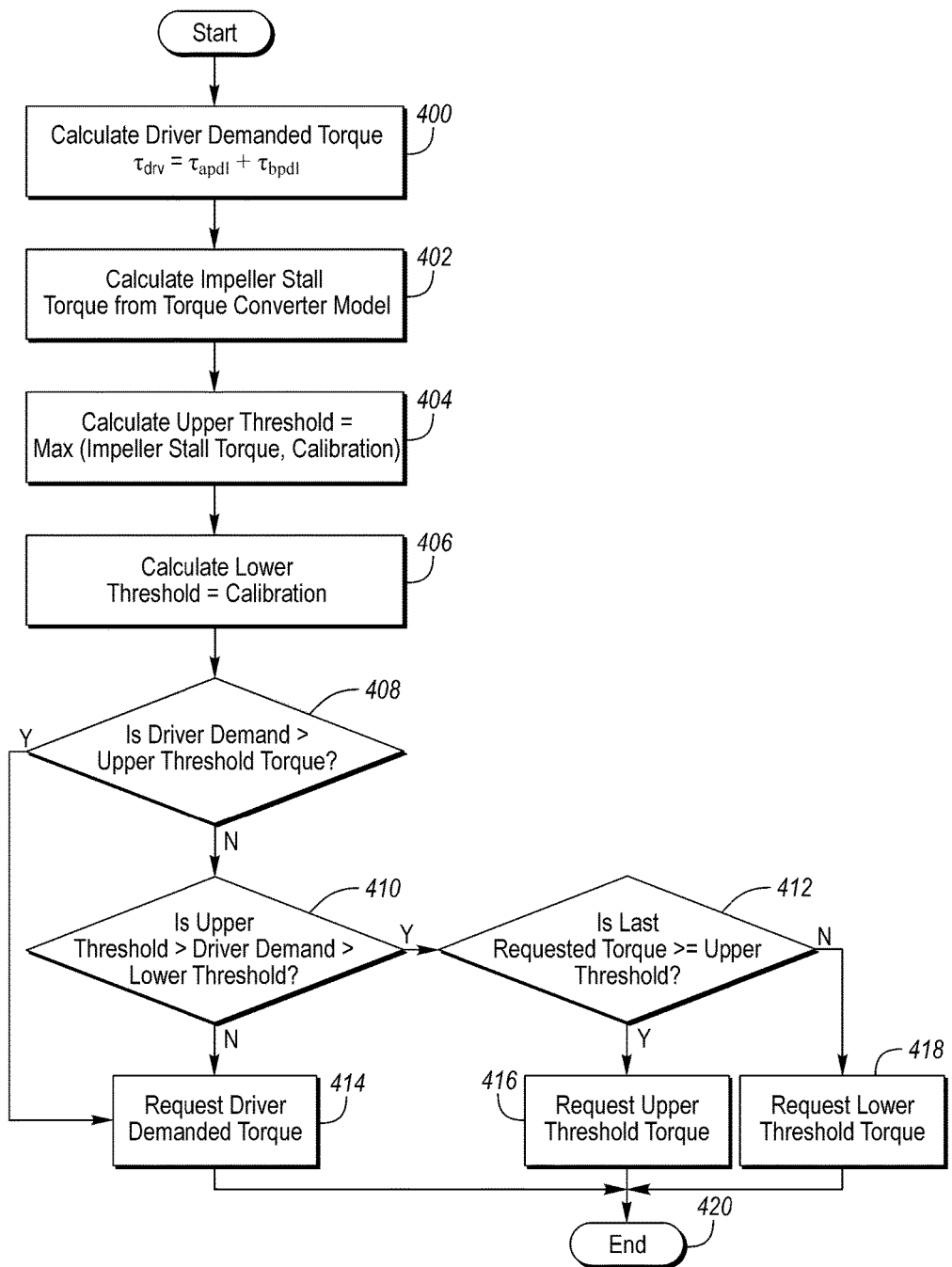
FIG. 4 is a flowchart of a possible sequence of operations for a vehicle powertrain system.

FIG. 4 depicts a flowchart of a possible sequence of operations for implementing a powertrain control system according to the described strategies. The operations may be programmed in a controller (e.g., PCU 150) that is part of the powertrain control system. At operation 400, a driver demand torque may be calculated. The driver demand torque may be a sum of an accelerator pedal torque component and a brake pedal torque component. The driver demand torque may be an amount of torque desired at the drive wheels. The driver demand torque may be computed at various points in the powertrain. The driver demand torque at the input of the torque converter may be computed based on the gear ratios of the gearbox 124 and the differential 140. The driver demand torque at the input to the torque converter may be based on a torque multiplication factor of the torque converter.

At operation 402, an impeller stall torque may be computed from a torque converter model. The impeller stall torque may be computed as described above. At operation 404, the upper torque threshold 204 may be computed as a maximum of the impeller stall torque and a calibration value. At operation 406, the lower torque threshold 206 may be computed. For example, the lower torque threshold 206 may be a predetermined calibration value.

At operation 408, the driver demand torque at the torque converter input may be compared to the upper torque threshold 204. If the driver demand torque is greater than the upper torque threshold 204, operation 414 may be executed. At operation 414, the driver demand torque may be requested as the powertrain torque command. If the driver demand torque is less than or equal to the upper torque threshold 204, operation 410 may be performed.

At operation 410, a check may be performed to determine if the driver demand torque is between the upper torque threshold 204 and the lower torque threshold 206. If the driver demand torque is not between the upper torque threshold 204 and the lower torque threshold 206, operation 414 may be performed. In this case, the driver demand torque may be less than the lower torque threshold 206. At operation 414, the driver demand torque may be requested as the powertrain torque command. If the driver demand torque is between the upper torque threshold 204 and the lower torque threshold 206, operation 412 may be performed.

At operation 412, the previous powertrain torque command is compared to the upper torque threshold 204. If the previous powertrain torque command is greater than or equal to the upper torque threshold 204, operation 416 may be performed. At operation 416, the upper torque threshold 204 may be requested as the powertrain torque request. If the previous powertrain torque command is less than the upper torque threshold 204, then operation 418 may be performed. At operation 418, the lower torque threshold 206 may be requested as the powertrain torque command.

Operation 420 may be performed after outputting the powertrain torque command. At operation 420, the control iteration may be ended. The operations may be periodically repeated to update the powertrain torque command over a drive cycle of the vehicle.

The powertrain torque command at the input of the torque converter 122 may be achieved by operation of the engine 114 and electric machine 118. The electric machine 118 may be operated by commanding a torque output of the electric machine 118. For example, the power electronics 156 may receive a commanded electric machine torque and control the torque output of the electric machine 118 to achieve the commanded electric machine torque. An engine control module or function may receive an engine torque command and may adjust engine operating parameters to achieve the engine torque command. The engine 114 may be operated to adjust engine torque by adjusting throttle position, valve timing, air/fuel mixture, spark/ignition timing and by starting/stopping the engine 114. In some modes of operation, the electric machine torque may be applied along with an engine torque. In some cases, the electric machine torque may modify the engine torque to achieve the powertrain torque command at the input of the torque converter 122. In other case, the engine 114 or the electric machine 118 may be operated alone to satisfy the powertrain torque command. The combination of electric machine torque and engine torque to satisfy the powertrain torque command may depend on the operating mode of the vehicle (e.g., engine running or engine stopped). In some cases, a combination of engine torque and electric machine torque may be chosen to minimize fuel consumption.

The control strategy described improves driver satisfaction by reducing driveline clunk and powertrain noise. By monitoring the impeller stall torque during the drive cycle, the operating limits are continually adjusted to ensure an adequate torque range for reducing clunk.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain control system comprising:
an engine and an electric machine coupled to a gearbox through a torque converter; and
a controller programmed to, in response to a driver demand torque at the torque converter being between an impeller stall torque of the torque converter and a predetermined negative torque and a torque at the torque converter being greater than the impeller stall torque, command the engine and the electric machine to cause the torque to be the impeller stall torque.

2. The powertrain control system of claim 1, wherein the controller is further programmed to, in response to the driver demand torque falling below the predetermined negative torque, command the engine and the electric machine to cause the torque to achieve the driver demand torque.

3. The powertrain control system of claim 1, wherein the controller is further programmed to, in response to the driver demand torque being between the impeller stall torque and the predetermined negative torque and the torque being less than the predetermined negative torque, command the engine and the electric machine to cause the torque to achieve the predetermined negative torque.

4. The powertrain control system of claim 1, wherein the controller is further programmed to, in response to the driver demand torque being greater than the impeller stall torque, command the engine and the electric machine to cause the torque to achieve the driver demand torque.

5. The powertrain control system of claim 1, wherein the controller is further programmed to estimate the impeller stall torque during a drive cycle based on a model of the torque converter.

6. The powertrain control system of claim 1, wherein the controller is further programmed to, in response to a turbine speed of the torque converter being greater than a minimum impeller stall speed, limit the impeller stall torque to be greater than a predetermined positive torque threshold.

* * * * *